United States Patent
Hamada et al.

[11] 3,861,488
[45] Jan. 21, 1975

[54] COLLISION SPEED SENSOR
[75] Inventors: Tomohiro Hamada; Atsushi Ueda; Takumi Tatsumi, all of Himeji, Japan
[73] Assignee: Mitsubishi Denki Kabushiki Kaisha, Tokyo, Japan
[22] Filed: Mar. 3, 1972
[21] Appl. No.: 231,485

[30] Foreign Application Priority Data
Mar. 8, 1971 Japan.............................. 46-14977
Mar. 27, 1971 Japan.............................. 46-21696

[52] U.S. Cl............................ 180/91, 280/150 AB
[51] Int. Cl........................... B60r 21/02, B60q 1/52
[58] Field of Search ...... 180/91, 103, 82; 73/517 R; 280/150 AB; 324/146

[56] References Cited
UNITED STATES PATENTS
2,764,019  9/1956  Lindholm et al. .................... 73/71.2
2,944,804  7/1960  Persson et al. .................. 73/517 R X
3,474,680  10/1969  Babson et al. ...................... 73/517 R
3,483,759  12/1969  Venetos et al. .................... 73/517 R
3,495,675  2/1970  Hass et al. .............................. 180/91
3,654,412  4/1972  Haruna .................................. 180/91
3,703,300  11/1972  Gillund et al. ........................... 293/1

Primary Examiner—David Schonberg
Assistant Examiner—Jack D. Rubenstein
Attorney, Agent, or Firm—Wenderoth, Lind & Ponack

[57] ABSTRACT

A collision speed sensor device is attached to a motor vehicle in the rear of and adjacent to its front bumper. It comprises a stationary electromagnetic coil and a magnet responsive to the collision of the vehicle with an obstacle to pass through the coil to induce a voltage across the latter having a maximum value proportional to the speed of movement of the magnet or the collision speed of the vehicle. The maximum voltage in excess of a predetermined value serves to actuate a safety device of the air bag or auto-seat belt type disposed on the vehicle.

7 Claims, 5 Drawing Figures

PATENTED JAN 21 1975 3,861,488

3,861,488

COLLISION SPEED SENSOR

BACKGROUND OF THE INVENTION

This invention relates to a device for sensing the collision speed of a motor vehicle upon its colliding with another motor vehicle or an obstacle thereby to actuate the associated safety device for the purpose of protecting the operator and fellow passengers.

In order to protect operators of motor vehicles and their fellow passengers against injury caused from their collision with another motor vehicle or an obstacle, there have been already proposed various types of safety means such as the air bag system, auto-seat belt system etc. required to be operatively coupled to the collision speed sensor device. The collision speed sensor device must be responsive to the collision of the associated motor vehicle with another motor vehicle or an obstacle to provide a collision signal and further must sense the level of collision speed. This is because, in the air bag system, for example, an air bag involved is disabled to expand in response to any collision occurring at a collision speed not exceeding its maximum permissible value above which the collision can injure a person or persons within the vehicle for the purpose of ensuring the operational capability of the vehicle in the low speed mode of operation as well as preventing the occurrence of secondary evils following the expansion of the air bag.

The sensing of the collision speed can be generally accomplished by mechanically or electrically measuring a time interval for which a body to be sensed moves a predetermined fixed distance. The mechanical measurement successively operates a pair of contacts spaced away from each other by a predetermined fixed distance while the electrical measurement replaces the two contacts by a pair of reed switches operative to move a magnet. An alternative of the electrical measurement may utilize an electroluminescent diode and a photodiode for detecting each position utilized to measure the distance. The mechanical measurement using the contacts is disadvantageous in that the contacts may be put in bad engagement with each other due to the oxidation thereof. Also the electrical measurement employing the reed switches has the objections that the operating point of the switches are very difficult to be adjusted and the device is low in resistance to vibration. The other electrical measurements utilizing the diodes are also low in resistance to vibration and expensive. Therefore the conventional devices as above described are not suitable for use with safety means required to be high in reliability.

SUMMARY OF THE INVENTION

Accordingly it is an object of the invention to provide an improved contact-less device for sensing the collision speed of a motor vehicle which is excellent in resistance to vibration, high in reliability and inexpensive to be manufactured.

The invention accomplishes this object by the provision of a collision speed sensor device for use with a motor vehicle, comprising, in combination a housing, an electromagnetic coil fixedly disposed within the housing, and a magnet member movably disposed within the housing to be capable of forming a magnetic path interlinked with the electromagnetic coil, the magnet member responding to collision of the associated motor vehicle with an obstacle to pass through the electromagnetic coil to induce a voltage thereacross as determined by the speed of movement of the magnet member thereby to sense a collision speed of the vehicle.

BRIEF DESCRIPTION OF THE DRAWING

Other objects and features of the invention will become more readily apparent from the following detailed description taken in conjunction with the accompanying drawing in which.

DESCRIPTION OF THE PREFERRED EMBODIMENT

Figure 1:
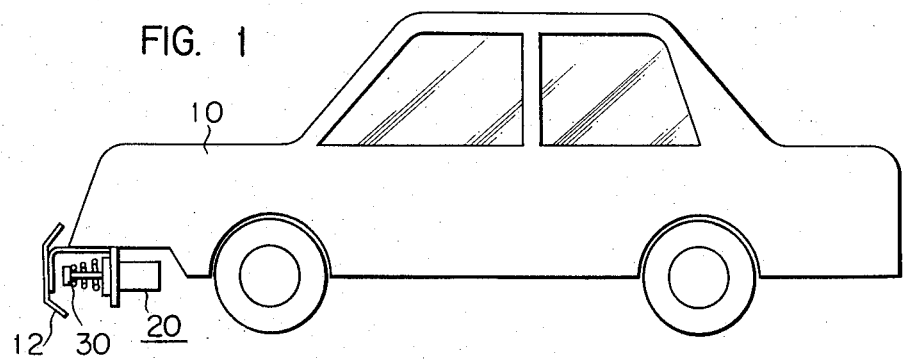
FIG. 1 is a side elevational view of a motor vehicle provided with a collision speed sensor device constructed in accordance with the principles of the invention.

Referring now to FIG. 1 of the drawing, it is seen that the arrangement disclosed herein comprises a motor vehicle including a body 10, a front bumper 12 secured at the front extremity of the body 10 and a collision speed sensor device constructed in accordance with the principles of the invention. The speed sensor device generally designated by the reference numeral 20 is attached to the body 10 in rear of and adjacent to the front bumper 12.

Figure 2:
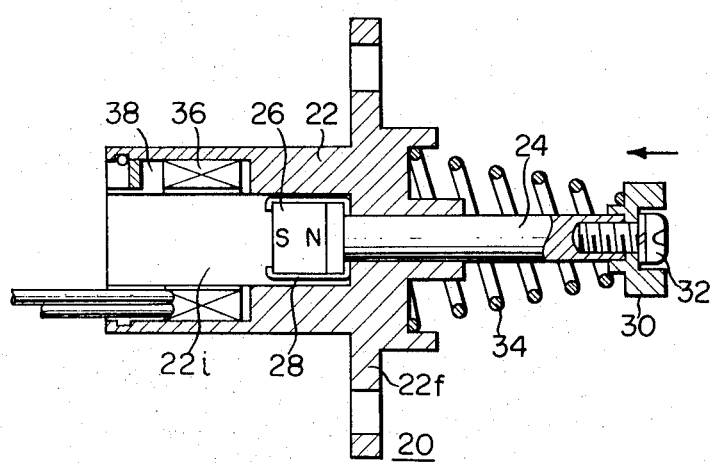
FIG. 2 is a cross sectional view of the device schematically shown in FIG. 1.
Figure 3:
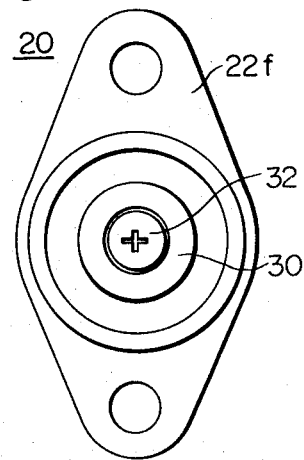
FIG. 3 is an end view of the device shown in FIGS. 1 and 2.

FIGS. 2 and 3 show the details of the collision speed sensor device 20. As shown, the device 20 comprises a housing 22 of any suitable magnetic material in the form of a hollow cylinder having one end closed with a flange 22f and the other end open to form a cylindrical hollow portion 22i. A rod 24 movably extends through the flange 22f of the housing 22 and has a permanent magnet member 26 with the illustrated polarity fixed to that end thereof normally reaching the bottom of the cylindrical hollow portion 22i through a nonmagnetic holder 28 so as to be normally located at the bottom of the hollow portion 22i of the housing. The rod 24 has a collision bearing member 30 of U-shaped section fixedly secured to the other end thereof as by a screw 32. Then a compression spring 34 is disposed around the rod 24 between the flange and collision bearing member 22f and 30 to normally maintain the magnet member 26 in its position illustrated in FIG. 2. Thus the magnet member 26 along with the adjacent portion of the housing 22 wall forms a closed magnetic path on the other end portion of the housing 22.

As shown in FIG. 2, a stationary electromagnetic coil 36 is disposed within the housing 22 adjacent the open end. More specifically, the coil 36 is disposed in a peripheral recess 38 formed on the open end portion of the wall of the housing 22 and includes a pair of leads for taking out a voltage induced thereacross in the manner as will be described hereinafter.

As shown in FIG. 1, the collision bearing member 30 opposes to the rear face of the front bumper 12 with a narrow spacing normally formed therebetween. When the motor vehicle as shown in FIG. 1 collides with another motor vehicle or an obstacle, a force is applied to the collision bearing member 30 in the direction of the arrow illustrated in FIG. 2 to cause the rod 24 to move in the hollow portion 22i of the housing 22 along with the magnet member 26 against the action of the spring 34, until the magnet member 26 passes through the coil 36.

As above described in conjunction with FIG. 1, the collision speed sensor device is secured in the rear of the front bumper of the motor vehicle. Normally several of such devices are disposed in the rear of the front bumper so that they respond to the collision of the vehicle with an obstacle to sense a collision speed thereby to generate a collision signal for actuating the associated safety device, for example, an air bag system or an auto-seat belt system. Under these circumstances, it is to be noted that the safety device should not be actuated in response to mechanical shocks other than the collision of the associated motor vehicle, for example, when the vehicle has gone over a large protrusion or recess or when it has been struck with flying pebbles. If an air bag or bags are eroneously operated in any of such cases then the operational capability of the motor vehicle will be lost leading to the occurrence of a failure.

In order to avoid the malfunction of the associated safety device, the spring 34, rod 24, magnet 26 and coil 36 are arranged in the inoperative state so that the spring 34 normally functions to bias the rod and magnet member 24 and 26 respectively so as to be sufficiently spaced away from the coil 36. That is, the magnet member 26 is normally located at the bottom of the hollow housing portion 22i whereby the magnet member 26 forms a closed magnetic path which is not interlinking with the coil 36. This measure ensures that the device 20 is prevented from generating any erroneous signal due to a vibration thereof.

Figure 4:
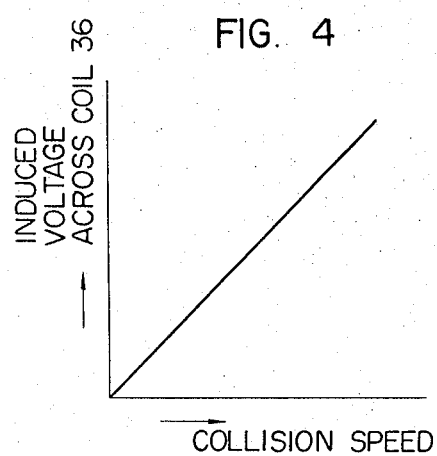
FIG. 4 is a graph plotting the voltage induced across the coil shown in FIG. 2 against a collision speed.

When a collision occurs between the motor vehicle and another one or an obstacle, the front bumper 12 applies an impact force to the collision bearing member 30 to move the rod 24 connected to the member 32 in the direction of the arrow shown in FIG. 2, thereby to cause the magnet member 26 to slide within the hollow housing portion 22i until the magnetic member 26 approaches or passes through the coil 36 as the case may be. This movement of the magnetic member 26 varies the amount of magnetic flux therefrom interlinking the coil 36 to induce a voltage thereacross in accordance with the speed of movement thereof. With the magnet member 26 passed through the coil 36, it has been found that the voltage induced across the coil 36 has a maximum value proportional to the collision speed as shown in FIG. 4. In FIG. 4, a voltage is plotted as the ordinate against the collision speed in abscissa. Because of the proportionality of the voltage to the collision speed, a minimum value of the collision speed to be sensed can be easily selected by controlling the resilience of the spring 34.

Figure 5:
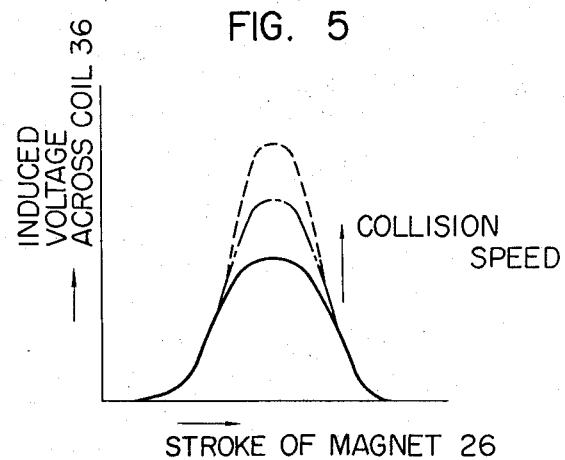
FIG. 5 is a graph illustrating the relationship between the voltage induced across the coil shown in FIG. 2 and a stroke of the magnet member also shown in FIG. 2 with the parameter being the collision speed.

FIG. 5 shows the voltage across the coil 36 (in ordinate) plotted against the stroke of the magnet member 26 (in abscissa). From FIG. 5 it is seen that the voltage induced across the coil 36 is low in magnitude on the early portion of the movement of the magnet member 26 and then increases to a maximum value when the magnet member 26 is aligned with the coil 36 in a direction perpendicular to the axis thereof. Thereafter the voltage decreases to describe the mirror image of the rising portion of the voltage. That is, the voltage induced across the coil 36 substantially follows a normal distribution curve.

Also the maximum value of the voltage induced across the coil 36 increases with the collision speed as shown at solid, broken and dotten lines in FIG. 5. It is noted that the graph of FIG. 4 has been depicted with the maximum induced voltages reading for respective collision speeds.

In FIG. 5, it is further to be noted that the curve includes a low voltage region on the beginning of the stroke or movement of the magnet member 26, this is absolutely required for the purpose of preventing the device from providing any erroneous output. It is to be noted also that for a short stroke of the magnet member due to its vibration or the impact of pebbles, the coil can only induce a very low voltage thereacross.

From the foregoing it will be appreciated that the object of the invention has been accomplished by the provision of a magnetic member adapted to pass through an electromagnetic coil in response to the collision of the associated motor vehicle with another one or an obstacle whereby the coil induces thereacross a voltage as determined by the speed of movement of the magnet member or the collision speed. Also, except for the case when a collision occurs, the magnet member is always maintained in a position where it forms a closed magnetic path which is prevented from interlinking with the coil, resulting in the complete absence of any malfunction of the device.

While the invention has been illustrated and described in conjunction with a single preferred embodiment thereof it is to be understood that various changes and modifications may be resorted to without departing from the spirit and scope of the invention. Also while the invention has been described in conjunction with a motor car, the same is equally applicable to a variety of motor vehicles other than motorcars.

What we claim is:

1. A collision speed sensor device for use with a motor vehicle comprising a housing, an electromagnetic coil fixedly disposed within only a part of said housing, a rod extending through said housing, a magnet member movably disposed within said housing on a first end of said rod, said magnet member being movable between a first position where the magnetic path of said magnet member is spaced from and substantially not interlinked with said electromagnetic coil and a second position where said electromagnetic coil is substantially interlinked with the magnetic path of said magnet member, collision bearing means connected to a second end of said rod at a position outside of said housing and responsive to the collision of the associated motor vehicle with an obstacle for causing said magnet member to move to said second position and for inducing a voltage across said coil which is proportional to the collision speed of the motor vehicle, and spring means positioned outside of said housing surrounding said rod between said housing and said collision bearing means for biasing said magnet member to said first position.

2. A collision speed sensor device as claimed in claim 1, wherein said voltage induced across said electromagnetic coil is operative to actuate a safety device disposed in the motor vehicle to prevent a person within the vehicle from being injured due to the collision.

3. A collision speed sensor device as claimed in claim 1, wherein the voltage induced across said electromagnetic coil is a normal distribution function of a stroke of said magnet member.

4. A collision speed sensor device as claimed in claim 1 wherein said coil is cylindrical and wherein when said magnet member is in said second position, it is located within said coil.

5. A collision speed sensor device for use with a motor vehicle comprising, in combination, a cylindrical housing of a magnetic material including a hollow cylindrical portion, an electromagnetic coil fixedly disposed within said hollow cylindrical portion of said housing, a magnet member movably disposed within said hollow cylindrical portion of said housing, a rod including one end having said magnet member attached thereto and the other end portion projecting beyond said housing, a collision bearing member attached at the other end of said rod, and a compression spring disposed around the projecting portion of said rod between said housing and said collision bearing member to normally bias said magnet member so as to be at a position remote from said electromagnetic coil, said collision bearing member responding to the collision of the associated motor vehicle with an obstacle to move said magnet member through said rod against the action of said compression spring.

6. A collision speed sensor device as claimed in claim 5, wherein said compression spring is variable in resilience to change the voltage characteristic exhibited by said electromagnetic coil thereby to adjust the setting of said coil.

7. A collision speed sensor device as claimed in claim 5 wherein said compression spring is preset to normally hold said magnet member at its position where said magnet member forms a closed magnetic path with said housing, and to permit said magnet member to approach said electromagnetic coil when the motor vehicle collides with an obstacle, and wherein said coil produces a maximum voltage thereacross when said magnet member is substantially aligned with said coil in a direction perpendicular to the axis thereof.

* * * * *